Nov. 2, 1954  S. J. OTIS  2,693,169
AUTOMATIC FEEDING APPARATUS FOR LAYING-BATTERIES
Filed Feb. 8, 1951  7 Sheets-Sheet 3
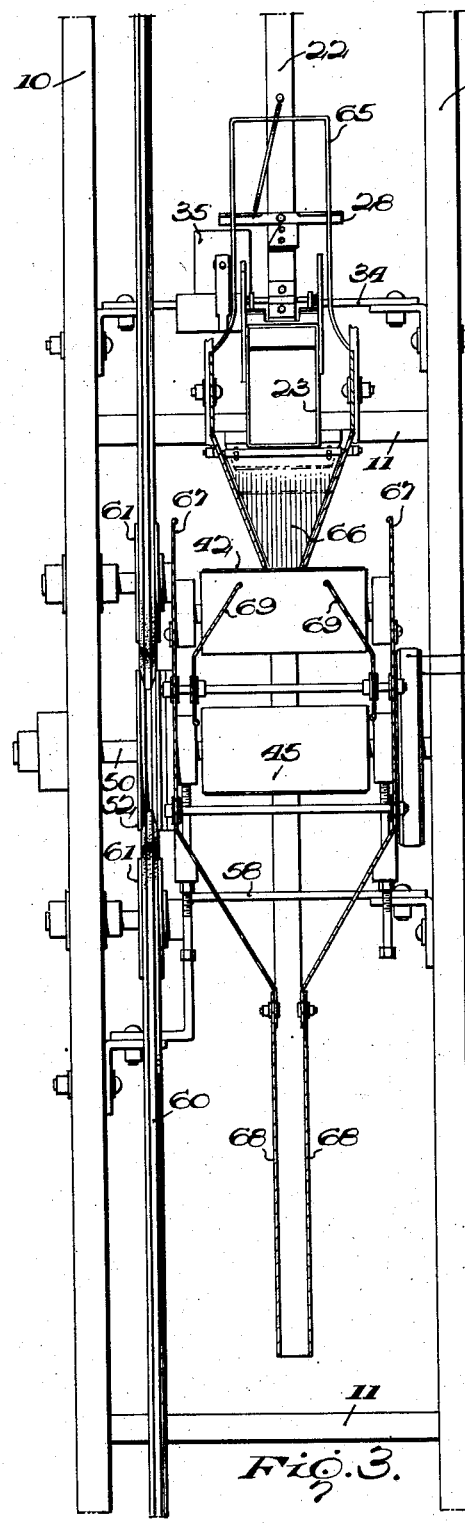
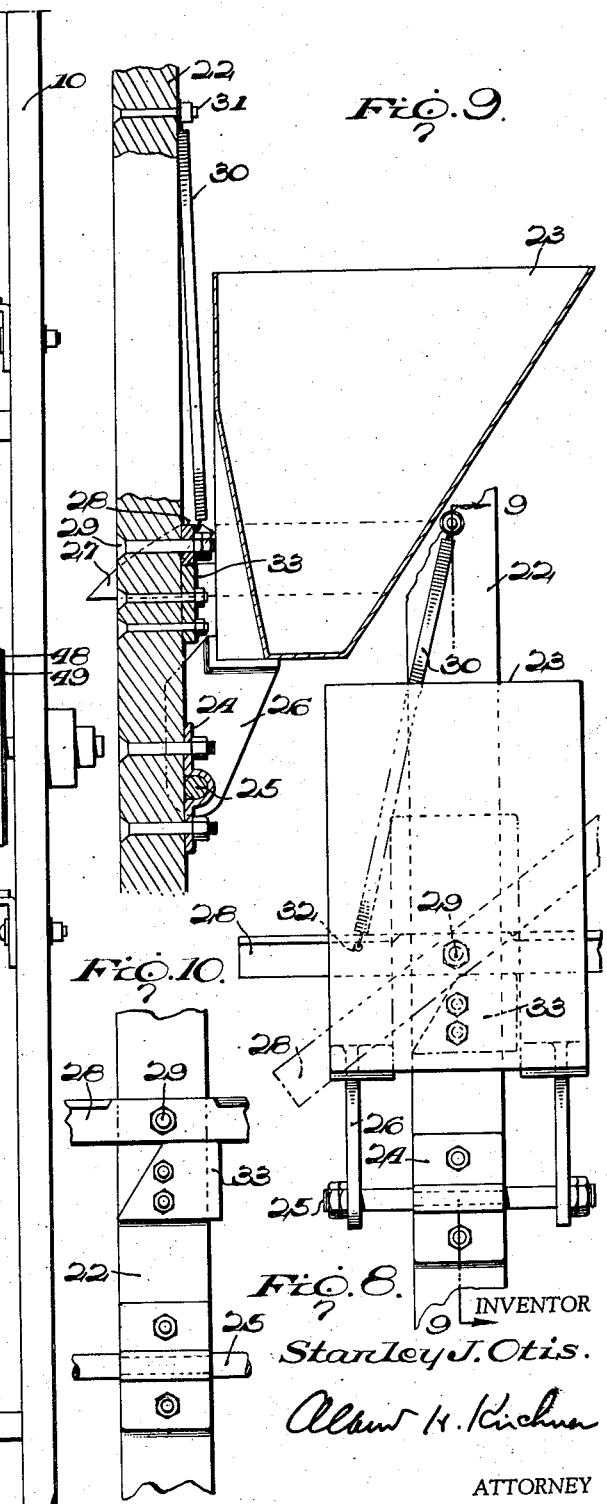
INVENTOR
Stanley J. Otis.
ATTORNEY

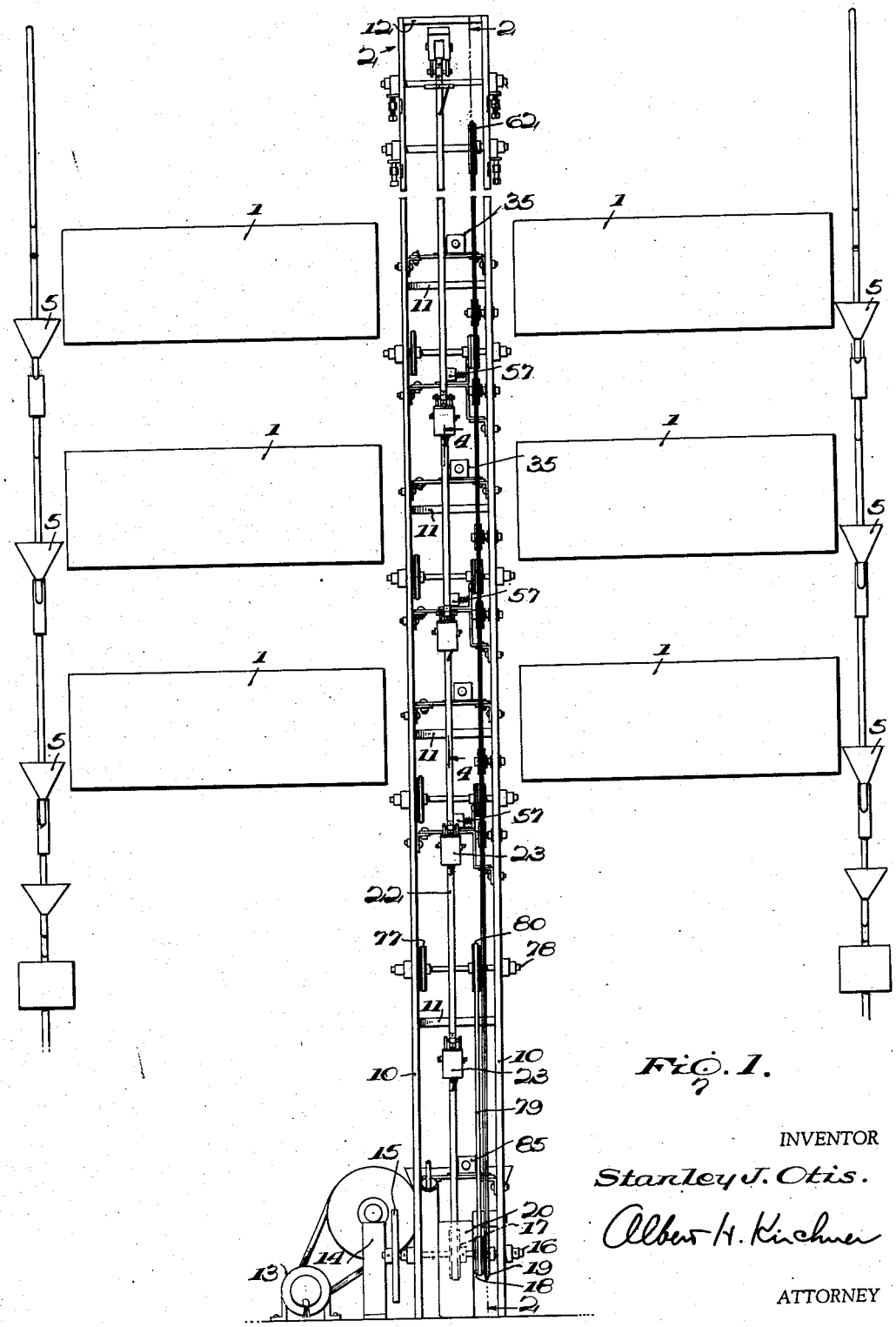

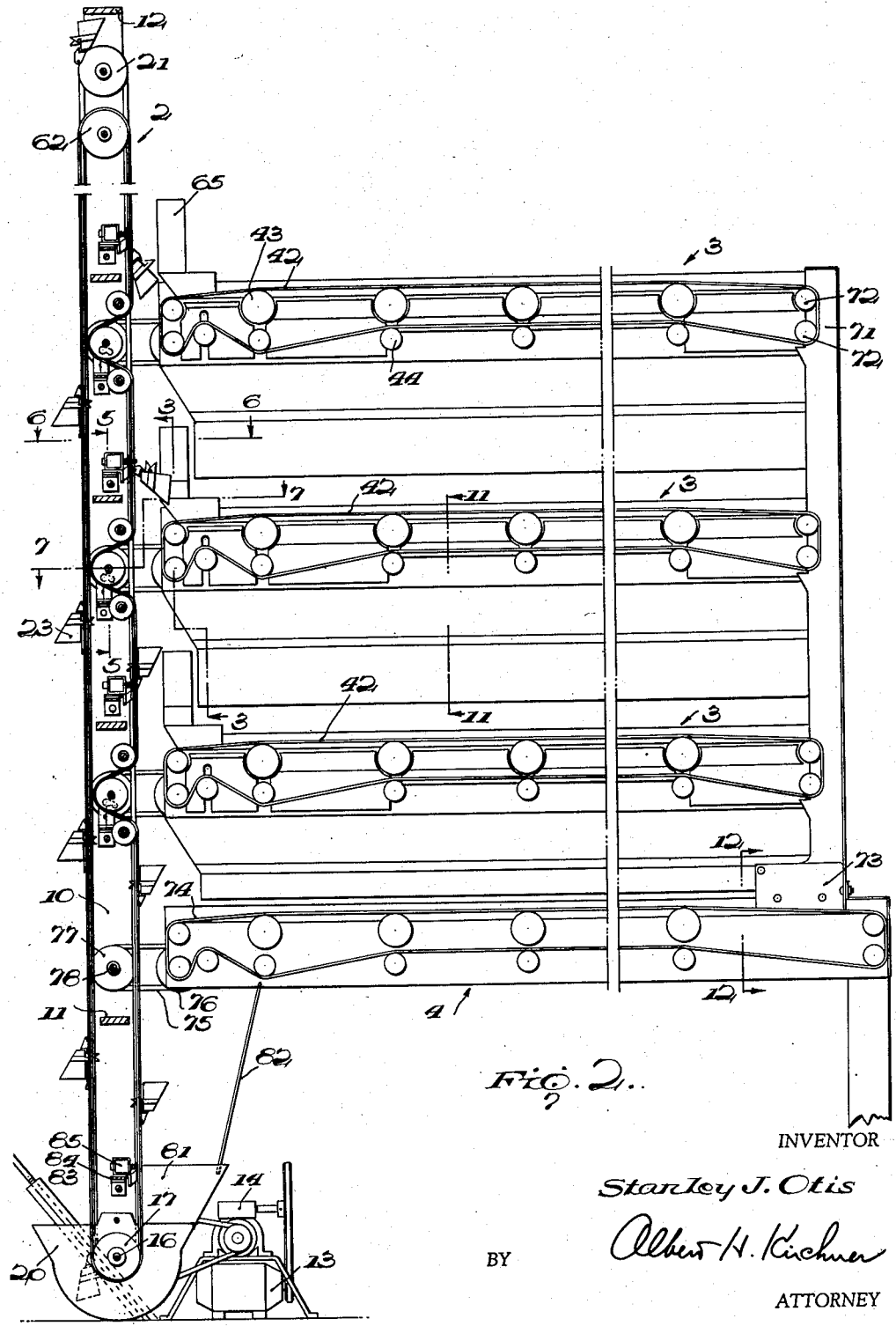

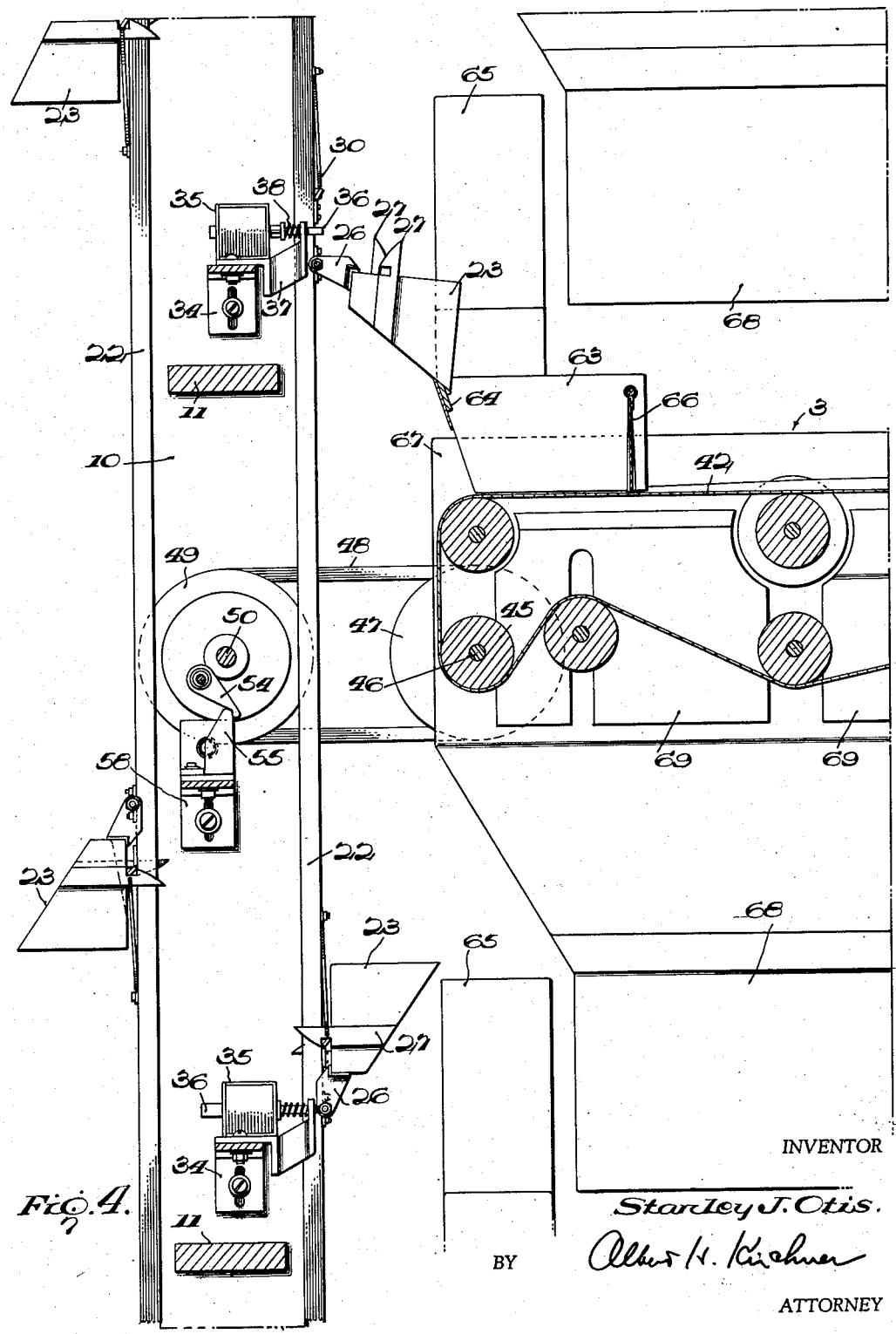

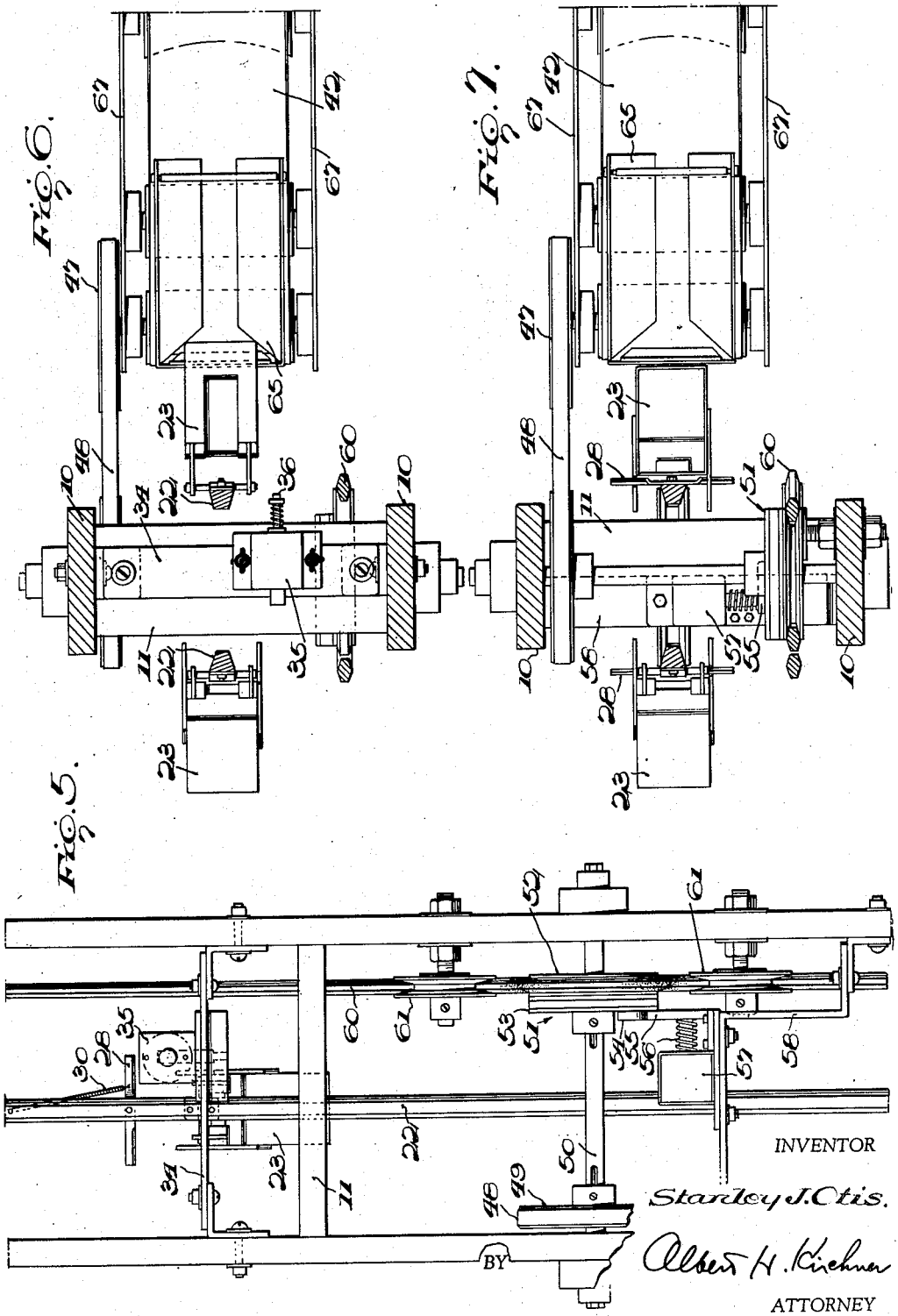

Nov. 2, 1954 S. J. OTIS 2,693,169
AUTOMATIC FEEDING APPARATUS FOR LAYING-BATTERIES
Filed Feb. 8, 1951 7 Sheets-Sheet 6
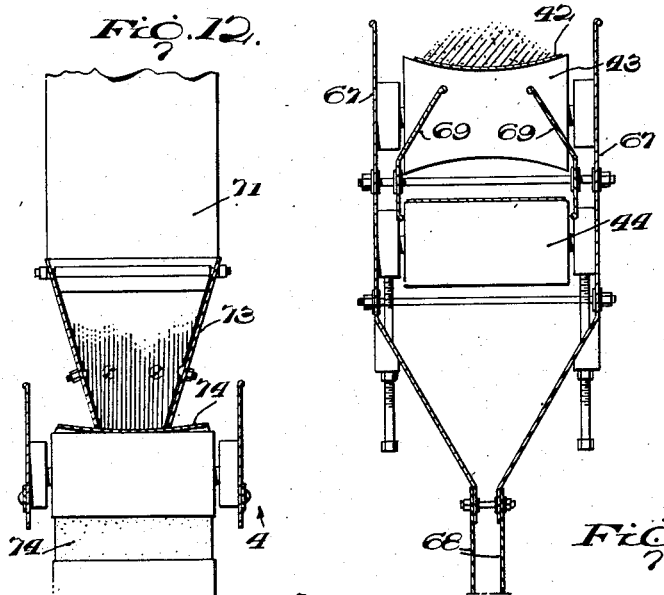
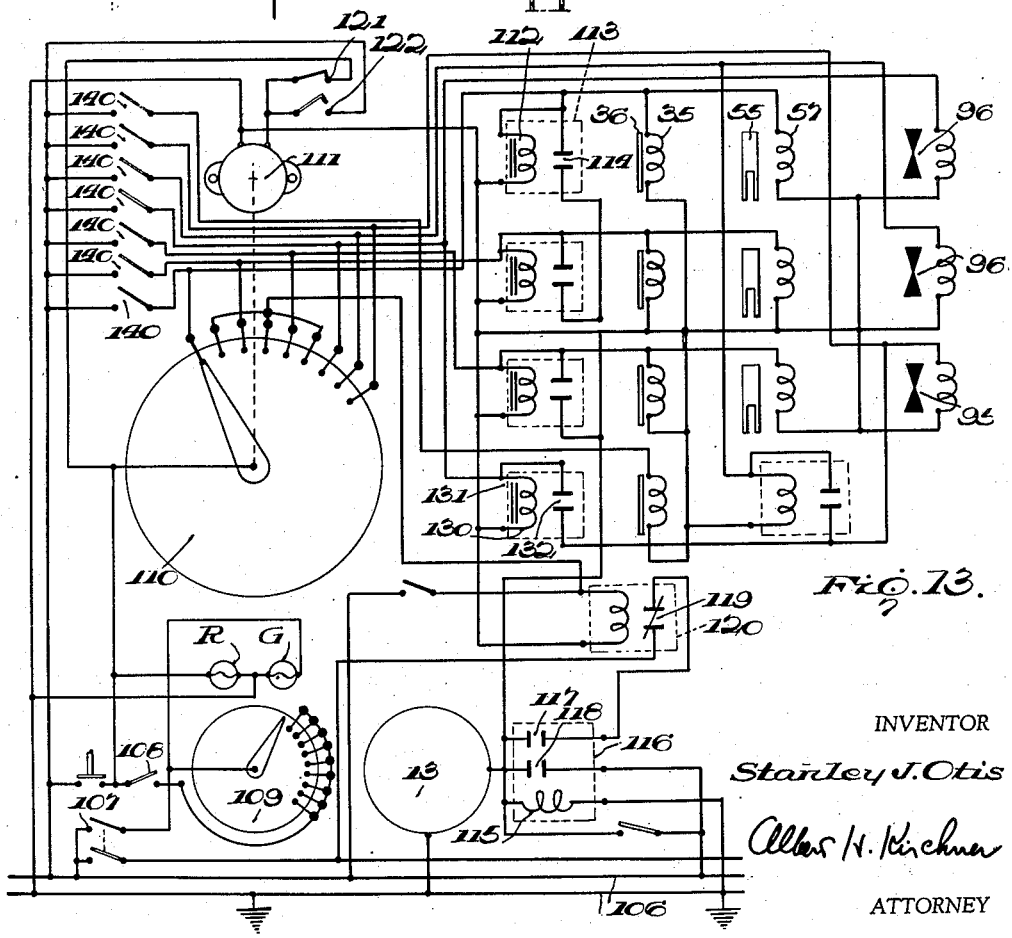
INVENTOR
Stanley J. Otis
ATTORNEY

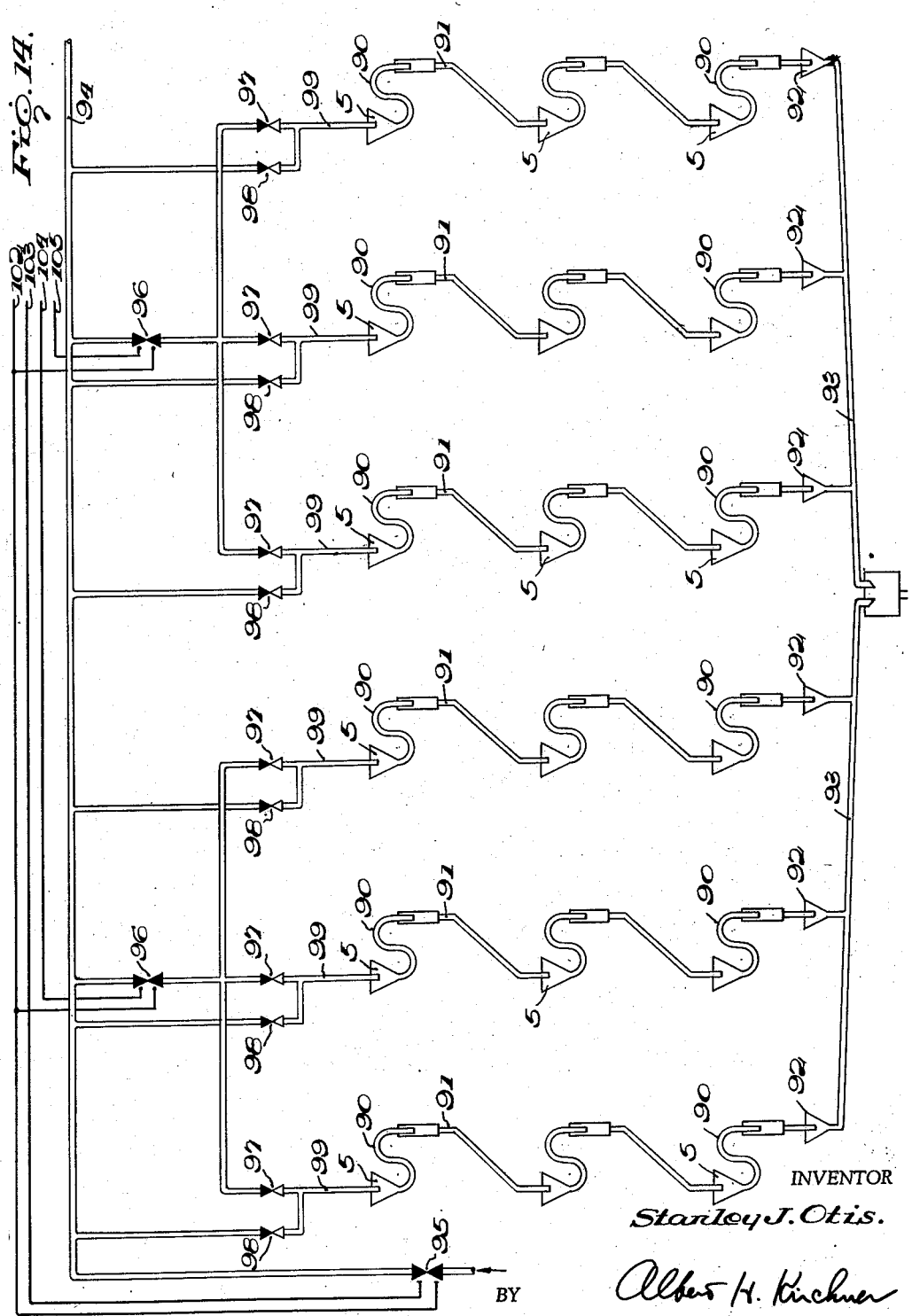

United States Patent Office 2,693,169
Patented Nov. 2, 1954

2,693,169

AUTOMATIC FEEDING APPARATUS FOR LAYING-BATTERIES

Stanley J. Otis, Madison, Wis.

Application February 8, 1951, Serial No. 210,015

12 Claims. (Cl. 119—18)

The present invention relates broadly to material handling apparatus, including distributing a bulk substance at multiple-level discharge points and conveying the same therefrom, and it relates also to liquid distribution. More particularly, in a representative field of application, the invention provides a feeding system, or a watering system, or a combined feeding and watering system for use in the raising of poultry and the like, including especially hens in an egg laying battery.

In its more specific aspects the invention provides a feeding and watering system which may be automatically controlled for cyclic operation in supplying feed and drinking water to predetermined units of a battery at predetermined intervals of time.

The batteries to which the invention is particularly applicable, and in terms of which it will be illustrated, comprise stacks or columns of vertically superposed cages in which chickens are kept during substantially their whole growing and/or laying period. Economical egg and poultry production generally requires large scale operation, and it is of course important that labor, feed waste and power consumption be kept at a minimum.

The principles of the present invention include principally, in the fullest development of the apparatus, the automatic cyclic supply of dry-mash feed successively to conveyor belts serving different units of a plural unit installation, the automatic removal of unconsumed feed and its return to the original supply, and the periodic flushing of drinking water containers and the maintenance of fresh water in them, all done in accordance with a predetermined program normally requiring a minimum of attention.

An important feature of the invention is the fact that the entire system is electrically operated and controlled, with the parts so related and arranged as to be operable by a single small motor through simple and inexpensive mechanism, thus keeping construction and operating costs at a minimum.

The foregoing and other objects and advantages are attained, generally speaking, by mounting horizontally movable conveyor belts between two spaced rows of cages at each level in a multiple tier installation, providing drinking water containers along the opposite sides of the cages, mounting a feed elevator at the head ends of the superposed belts and a feed chute and return at the tail ends, arranging for operation of the elevator and only one belt at a time, so that a light motor will suffice, and periodically, preferably while the feeding mechanisms are not operating, opening a system of flushing and supply valves to clean and replenish the drinking water supply.

A preferred embodiment of the invention is illustrated in the accompanying drawings and will be described and explained in detail hereinafter, but it is to be understood that this embodiment is selected simply to exemplify the invention and that the inventive principles are not limited to the specific form shown but are of wide application as defined by the broader of the appended claims.

Referring to the drawings,

Figure 1 is an end elevational view of an installation showing principally the feed elevator structure and its relationship to the tiers and rows of cages;

Fig. 2 is a vertical longitudinal sectional view taken on the line 2—2 of Fig. 1 showing the feed conveyor structures in side elevation with the nearer side plates thereof removed;

Fig. 3 is a vertical cross sectional view taken on the line 3—3 of Fig. 2, on a relatively larger scale, showing principally a feed elevator bucket in dumped position above a feed conveyor belt;

Fig. 4 is a vertical longitudinal sectional view taken on the line 4—4 of Fig. 1, on the same scale as Fig. 3, showing the relationship of the feed elevator buckets to the head end of one of the feed conveyor structures;

Fig. 5 is a vertical cross sectional view taken on the line 5—5 of Fig. 2, on the same scale as Figs. 3 and 4, showing principally the mounting of the bucket-tripping solenoids and of the clutch-controlling solenoids;

Fig. 6 is a horizontal section on the line 6—6 of Fig. 2, on the same scale as Figs. 3, 4 and 5, showing the same parts as are shown in Fig. 4;

Fig. 7 is a horizontal section taken on the line 7—7 of Fig. 2, on the same scale as Fig. 6 but at a lower level, and differs from Fig. 6 in that it shows the arrangement of the clutch-controlling solenoids;

Fig. 8 is an enlarged detail front elevational view of one of the buckets;

Fig. 9 is a vertical longitudinal sectional view taken on the line 9—9 of Fig. 8;

Fig. 10 is a detail elevational view showing the bucket elevator belt, tripping arm and tripping arm stop;

Fig. 11 is a vertical cross sectional view taken on the line 11—11 of Fig. 2 through the feed conveyor belt and overflow trough;

Fig. 12 is a vertical cross sectional view taken on the line 12—12 of Fig. 2 through the feed return conveyor structure;

Fig. 13 is a diagrammatic view of the electrical control circuit; and

Fig. 14 is a partly diagrammatic view of the watering system.

Diagrammatically shown at 1 in Fig. 1, out of scale relatively to the rest of the structure, are a plurality of cages for containing animals, such for example as chickens, to be fed and watered by the present invention. These cages are mounted by any suitable supports in horizontal tandem arrangement at several superposed levels, such as the three shown, with the cages of each level divided into two parallel lines or rows, one line or row being set on each side of a central elevator structure which in its entirety is designated 2 in Figs. 1 and 2. It will be understood that the six cages indicated in Fig. 1 are the end cages of six lines or rows, and that each line or row may contain as many cages arranged end to end in it as can be juxtaposed to the lengths of the conveyor structures which extend horizontally from the elevator structure, between the rows of cages, as shown in Fig. 2, where the whole of each conveyor structure is designated 3. There is nothing critical about this length; it will be determined by the size and capacity desired for the installation. Similarly, the cages may be arranged in any reasonable or convenient number of levels greater or less than the three shown in the illustrative embodiment.

The elevator structure 2 stands upright on the room floor, aligned with the vertical space between the two stacks of superposed rows of cages and preferably set back slightly from the endmost cages so that the structure will be out of reach of the animals in the cages and so that points on the conveyors 3 at or near their head ends, which are their ends adjacent the elevator structure, will be located in about the plane of those end walls of bank of cages which appear in Fig. 1.

A principal function of the elevator structure is to raise feed from a bottom hopper and deposit it on each conveyor, the belt element of which is then operated to move the feed into reach of the animals (typically chickens and hereinafter so called) occupying cages all along the length of the conveyor. Cooperating with the hopper, elevator and conveyors is a return conveyor, generally designated 4 in Fig. 2, provided beneath the feed conveyors, for collecting unconsumed feed and returning it to the hopper for redistribution.

Watering is provided by the containers 5 which, as shown in Fig. 1, are cups located just beyond the far side of each cage, opposite the side from which the chickens have access to the feed conveyor belts. Thus the feeding and watering devices are kept separated, which is important from the standpoint of cleanliness, but they are brought into mutual cooperation by means of the automatic controls, as will be described and explained hereinafter.

The elevator

The elevator structure comprises a vertical ladder-like framework formed of a pair of rigid upright wood or metal strips 10 braced at intervals by crosspieces 11 and surmounted by a top cross member 12. In fixed relation to the bottom of the framework is an electric motor 13 connected through a speed reducer 14 with a pulley 15 which is fast on a main drive shaft 16 journaled in the uprights 10. Fast on the main drive shaft 16 are three pulleys, 17, 18 and 19.

The pulleys 18 and 19 form no part of the elevator mechanism but are concerned with the means for driving the feed conveyor belts and feed return belt, as will be hereinafter explained. The pulley 17 drives the elevator and is located at about the middle of the shaft 16, where it is enclosed in an open-topped feed supply hopper 20, and trained over the pulley 17 and over an idler pulley 21 at the top of the framework is an endless elevator V-belt 22 on which buckets 23 are mounted at spaced intervals. The belt is preferably run at a lineal speed of about four feet per minute by the motor 13 and speed reducer 14.

As best shown in Fig. 2, the buckets 13 are carried by the belt 22 down into the hopper 20 where they turn around the pulley 17 and dip into a supply of dry-mash feed and become filled therewith. They then rise with the right-hand run of the belt 22 past the several feed conveyor structures 3, onto any one of which they can be dumped, by the mechanism which will now be explained.

The belt 22 may be of standard V-type, and the buckets 23 are mounted on it in the manner best shown in Figs. 3, 8, 9 and 10. This includes a yoke 24 bolted at its top and bottom to the belt and mounting through its middle a pivot pin 25 which extends between two legs 26 fastened to the opposite sides of the bottom of the bucket, as by soldering, welding or the like.

The bucket is best made more or less rectangular in cross section but upwardly flaring and grooved or channeled in its lower rear wall, as is evident from a comparison of Figs. 3, 8 and 9. The bucket is held upright during its rise on the run of the belt 22 appearing at the right in Fig. 2 by the cooperation of a pair of latch arms 27 with a tripping arm 28, related in the following manner:

The two latch arms 27 are secured to the opposite outer side faces of the bucket and project considerably to the rear thereof, as appears in Figs. 4 and 9. As also there shown, the rearwardly projecting portions of the two arms are oppositely beveled and notched, so that the undersurface of one arm is beveled and notched, and the upper surface of the other is beveled and notched, with each of the beveled portions leading to the lip of its notch, which is located adjacent to the rear wall of the bucket.

The tripping arm 28 is pivoted centrally at 29 on the belt 22 sufficiently above the pivot pin 25 so that the transversely projecting end portions of the arm 28 will be seated in the notches of the arms 27 when the arm 28 is disposed more or less straight transversely of the belt and the bucket is disposed vertically, with its back up against the belt, as shown in Fig. 9. The arm 28 is normally held in this transverse position by a coil spring 30 which has one end anchored at 31 to the belt 22 and its other end extended down along the belt and anchored at 32 to a point on the arm 28 considerably to one side of the pivot 29 thereof, thus biasing the arm to seated position against a stop 33 secured to the belt. On the side at which the spring 30 is anchored at 32 to the arm 28 the stop 33 is cut away so that the arm can be swung down on this side against the tension of the spring 30, as shown in Fig. 8, but cannot swing beyond horizontal in the opposite direction, to which horizontal position it will invariably be restored by the spring 30 on release of any interfering force, as indicated in Fig. 8.

It is believed to be evident from the foregoing that if the bucket 23 be swung with any appreciable force about its pivot 25 back toward the belt 22, the cam faces of the arms 27 will strike the tripping arm 28 and turn the latter about its pivot 29 to more or less the dotted line position shown in Fig. 8 until the arm 28 is snapped into position behind the notches in the arms 27. The parts then occupy the relation shown in Fig. 9 and in full lines in Fig. 8 in which the bucket is held securely against the belt 22 in a position from which it can be released only by rocking the arm 28 again to its dotted line position of Fig. 8. With the arm rocked to such canted position it will be evident that gravity will cause the bucket to swing forwardly and down to discharge any load that it may contain.

In order to release a bucket from its upright, loaded position shown in the lower portion of Fig. 4 and cause it to dump its contents onto one of the feed conveyor structures 3, as shown at the upper portion of Fig. 4, the apparatus includes tripping devices mounted in the elevator structure opposite each of the feed conveyor structures. Each of these tripping devices comprises a shelf 34 bridging the two upright strips 10 and mounting a solenoid 35, the armature of which projects in the form of a tripping pin 36 guided in a bracket 37 which extends from the shelf 34. A coil spring 38 is compressed between the bracket 37 and an abutment on the pin 36 to keep the pin normally retracted. However, energization of the solenoid operates against the force of the spring 38 to project the pin 36, and the parts are so mounted and related that the projected pin will lie in the path of that end portion of an ascending tripping arm 28 which is seen at the left in Fig. 8 and cause the arm to be deflected to its dotted line position shown in that figure. Thus a solenoid 35 and its related mechanism, located in the elevator structure opposite each of the feed conveyor structures 3, serves to control the supply of feed to the conveyor structure, by causing a bucket to dump when the solenoid is energized, and by passing a bucket without dumping it when the solenoid remains unenergized.

Buckets that have been dumped continue up the elevator structure in the inverted position shown near the top of Fig. 2. Upon rounding the idler pulley 21 at the top of the elevator, each inverted bucket swings down by gravity against the belt 22 and its arms 27 cam the tripping arm 28 into latching position in the notches of the arms 27, thus holding the bucket securely against the belt 22 for refilling as the bucket rounds the drive pulley 17 in the feed supply hopper 20.

The bucket is able to make the turns around the pulleys 17 and 21, notwithstanding the connections at the points 25 and 28 between the bucket and the curving belt, because the channel or slot formed in the rear wall of the bucket accommodates entry of the belt into the overall confines of the bucket.

As indicated in Figs. 5 and 7, the arm 28 is given a top-forward twist in its two outer end portions. This has been found necessary or desirable so that when the latched bucket 23 is rounding its drive pulley in the hopper 20, proper bearing contact will be maintained between the arm 28 and the notch surfaces of the latch arms 27. Without this top-forward twist, the strong force exerted on the bucket as it digs into the feed in the hopper would tend to trip the bucket to released position.

Feed conveyor structures

Each of the feed conveyor structures 3 is mounted horizontally between two rows of cages 1 positioned at the same level, and each consists of a conveyor belt 42 supported by a series of upper rollers 43 and lower return rollers 44. These rollers are journaled in a suitable framing and preferably include conventional adjusting means for keeping the belt adequately tight as shown in Fig. 11. One of the belt supporting rollers, i. e., the roller 45 shown in Fig. 4, is made fast on a shaft 46 which carries at its outer end a pulley 47 driven through a V-belt 48 from a pulley 49 which is mounted on a clutch shaft 50 journaled in the uprights 10 of the elevator structure.

As best shown in Figs. 1, 3 and 5, the driven pulley 49 is mounted fast on one end portion of the clutch shaft 50, within the elevator structure framework and adjacent to one of the uprights 10 thereof, so as to be aligned in the same vertical plane with the driven roller 47, as shown in Fig. 4. Near the other end portion of the clutch shaft 50, within the framework of the elevator structure 2, there is mounted on the clutch shaft an automatic clutch 51, which may be of the type disclosed and claimed in the co-pending application Serial No.

197,482, filed November 24, 1950, by the present applicant and Norman J. Wedekind, entitled "Clutch Mechanism." This clutch mechanism, which need not be described in detail in this present application, includes a driving member in the form of a pulley 52 which is loose on the shaft 50 and a driven member 53 which is fast on the shaft. This driven member carries a tripping arm 54 which is normally biased by spring means to clutch the members to each other and hence to the shaft 50. The arm 54, however, is normally held in declutching position by a tripping finger 55 urged out into the rotational path of the arm 54 by the spring 56 surrounding the armature of a solenoid 57 mounted on a shelf 58. Thus the shaft 50 is normally held against rotation, even though the pulley 52 be rotating. The armature can be retracted against the spring 56 by energizing the solenoid, thus withdrawing the finger 55 from engagement with the arm 54, which results in clutching the members 52 and 53 and causing the shaft 50 to rotate in response to rotation of the pulley 52.

The pulley 52 is driven from the main drive shaft 16 (at the bottom of Figs. 1 and 2) by an endless double V-belt 60 trained over the pulley 19 and into engagement with each of the clutch pulleys 52. In order to drive these pulleys in the correct direction, so as to cause the upper runs of the feed belts 42 to travel from left to right as viewed in Figs. 2 and 4, the double V-belt 60 is trained over guide pulleys 61 above and below each of the pulleys 52, so that the latter pulleys will rotate in the opposite direction to that of the main drive shaft 16. This permits the latter shaft, rotating in a direction to carry the buckets 23 upwardly on the run adjacent the conveyor structures 3, to be used for driving the upper runs of the feed conveyor belts 42 from left to right in Figs. 2 and 4, away from the elevator structure. The belt 60 is returned around an idler pulley 62 journaled in the top of the uprights.

It will be understood from the foregoing that with the main drive shaft 16 rotating, driving power will be transmitted to the feed conveyor belts 42 whenever the corresponding solenoids 57 are energized, and that at all other times the drive shaft 16 will leave the feed conveyor belts 42 stationary.

Each of the feed conveyor structures 3 has mounted over its end portion adjacent to the elevator structure 2 a feed-unloading hopper 63. This may be made in the form of a sheet metal enclosure having an open bottom positioned close to the belt 42 and having a rear wall provided with a cushion bumper 64 onto which the tipped bucket 23 is adapted to fall. The hopper 63 may also have a pair of upright side plates 65 for keeping the contents of the bucket 23 from spilling as they discharge suddenly under the impact with which the bucket strikes the cushion 64. A fringed curtain 66 closes off the otherwise open front end of the hopper 63 to keep the feed from scattering out the front of the hopper and so as to tend to distribute feed at a more or less uniform depth on the belt 42 as it issues from beneath the curtain.

Side guard plates 67 of sheet metal are positioned close alongside the belt 42 from a level slightly above the upper run of the belt to a level somewhat lower than the return run thereof. The purpose of these guard plates is to confine the feed on the belt and to form with the belt a sort of trough from which the animals in the cages may take the feed. At their lower edges each of the pairs of side plates 67 becomes turned inwardly toward the other and terminates in one of a pair of cooperating closely spaced plates 68, or fringed fabric curtains, which form a long and narrow chute well adapted to direct spilled feed down onto the next subjacent feed conveyor belt 42. Feed guide baffle plates 69 are bent inwardly over the return run of the belt 42 to protect that run from feed pushed off the top run and direct such feed down into the trough between the plates 68.

The plates 67 and 68 extend, at their ends remote from the elevator structure 2, into a sheet metal chute 71, into which the upper run of the belt 42 is conducted by a pair of tail rollers 72. It will be evident that any feed remaining on the belts 42 can be carried by movement of the belts into the chute 71, into which it will drop as the belts reverse their direction around the tail rollers 72. The bottom of the chute 71 is provided with a curtain, like the curtain 66, extending between guide plates 73 of the return conveyor structure 4. This structure comprises a conveyor belt 74, mounted much like the belts 42 but driven in the opposite direction. The drive is effected by a V-belt 75 trained over a pulley 76 which is driven by a pulley 77 mounted on a countershaft 78 journaled in the side pieces 10 of the elevator structure 2. A V-belt 79 connects pulley 18 on the main drive shaft 16 with a pulley 80 on the countershaft 78 so that the shaft 78 and hence pulley 77 turn in the same direction as the main drive shaft 16. This direction, it will be remembered, is the opposite of that in which the clutch shafts 50 turn. Thus the upper run of the return belt 74 moves back toward the elevator structure, whereas the upper runs of the feed conveyor belts 42 move away from the elevator structure.

The tail end of the return conveyor structure 4 is positioned above the feed supply hopper 20, or an upper extension 81 thereof, and a baffle plate 82 may be provided to insure the dropping of all returned feed into the hopper 20.

Feed may be supplied to the hopper 20 from any suitable source and by any appropriate means, such for example as the tube 83, discharging into the forward part of the hopper where the rising buckets will tend to lift the feed as they fill. An agitator or stirrer, as shown in Fig. 2, may be associated with the filler tube to insure steady flow into the hopper.

Initial dumping

At a point on the elevator structure framework within the upper limits of the hopper 20 or its extension 81 there is provided a shelf 84 supporting a solenoid 85 similar to each of the shelves 34 and solenoids 35, so that energization of the solenoid 85 will trip a bucket as soon as it leaves the hopper and thereby dump the bucket contents back into the hopper. It will be appreciated that by this means the drive shaft 16 can be operated in order to move any of the conveyor belts 42 or 74, without lifting any feed out of the hopper 20. In this way feed on the belts 42 can be returned to the hopper 20 without raising any more feed to the belts.

To summarize the foregoing structure:
Whenever the drive shaft 16 rotates, buckets of feed are filled from the hopper. If feed is desired at any of the several levels of cages, the appropriate solenoid 35 is energized and each bucket thereafter rising past that solenoid becomes dumped into the hopper 63 at that level. At the same time the appropriate solenoid 57 is energized to actuate clutch 51 at that level, so as to cause the adjacent belt 42 to move and thereby carry feed from the hopper 63 along the length of the belt, between the cages 1 of the two rows that are to be supplied with feed. This movement can be continued until the entire upper run of the belt is covered by a layer of feed, after which the process can be repeated at a different level. While the elevator is operating the return belt 74 is moving to restore spilled feed back to the hopper 20. After feed has been exposed on all the belts 42 for a sufficient length of time, all the belts, both 42 and 74, can be operated to carry the leftover feed into the chute 71 and over the return belt 74 back into the hopper 20. During this operation the solenoid 85 is energized to dump buckets passing it and thereby keep feed from being supplied to any of the belts 42.

It will be evident from the foregoing that cages at any of the levels can be supplied with feed at any time, for as long a time as may be desired, and that the feed can be removed whenever desired.

As has been explained hereinabove, one of the purposes of the invention in its fullest development is to provide automatic means for supplying feed and water cyclically at repeated intervals. This phase of the invention will be explained after describing the watering mechanism which in itself forms an important part of the fully developed mechanism.

The drinking water supply

Mounted along the outer side walls of the cages at each of the several levels, opposite those walls along which the feed conveyor belts 42 travel, are the water cups 5. These may be provided in any suitable number and at any desired spacing. As shown in Fig. 14, each consists of a substantially conical vessel having a wide open top tapering to a discharge pipe formed in the shape of a gooseneck 90 which empties into a tube 91 leading into the open top of the cup 5 immediately below, at the next subjacent level of cages 1.

The bottommost cups 5 discharge through similar goosenecks 90 into funnels 92 which drain into waste pipes 93.

Fig. 14 shows a watering system divided into two identical halves, which may be positioned at the respectively opposite sides of the installation shown in Fig. 1. Both halves are supplied from a single main header 94 connected to a pressure source and controlled by a main solenoid valve 95. When this valve is open, water is delivered to a solenoid-controlled flushing valve 96 in each half of the system which in turn conducts the water to a flushing valve 97, one for each vertical group of cups 5. The main solenoid valve 95 also controls the flow of water, independently of the valves 96 and 97, to a filling valve 98. The valve 95 is movable between full open and full closed positions; as is also the valve 96. The valves 98 are permanently set to pass only a trickle of water, while the valves 97 are permanently set considerably more open, so as to pass a substantial flow. It will be evident that when the valves 95 and 96 are opened, by action of their solenoid controls, a large quantity of water will flow into each of the cups 5 of the upper tier through the filler pipes 99 into which each pair of valves 97 and 98 discharges. It will also be evident that with the valve 95 open and the valve 96 closed, a relatively small amount of water will flow through the valves 98 (because of the nearly closed setting of these valves), through the filler pipes 99 and into the cups 5 of the upper tier.

The relative rates of flow are such that flushing of the cups is accomplished when the valves 95 and 96 are both open, whereas filling of the cups is accomplished when valve 95 is open and valve 96 is closed. It will be understood that in the flushing operation water fills each of the cups 5 of the upper tier quite rapidly and, surging into and through the goosenecks 90, produces a siphon action, sucking water and accumulated debris from the cups. Rapid flow of this water down the outlet pipes 91 fills the cups of the next lower tier rapidly and the siphoning action is there repeated. The same action takes place successively in each tier of cups and the water is finally drained off through the pipes 93.

As water continues to flow rapidly through the valve 96 a second flushing action takes place, and flushings continue as long as the valve 96 remains open.

After a sufficient period of flushing to clean all the cups 5, the valve 96 is closed and the valve 95 is left open. At this point in the cycle some of the cups will be full of water, some will be empty, and some will be partially filled, depending upon their condition when the valve 96 was turned off. The cups are then filled by leaving the valve 95 open for a short time after the valve 96 is closed. In this condition of the system water flows slowly through each of the partially open valves 98 into the cups 5 of the upper tier and drips through the goosenecks 90 down into the cups of the next lower tier, thereby filling these cups without flowing fast enough to produce any siphon action. In this way the cups of all the tiers are soon filled, with any excess draining through the pipes 30, whereupon the valve 95 may be closed.

As shown in Fig. 14, the valve 95 is connected to electrical leads 102 and 103, and the valve 96 of one bank of the watering system is connected to the leads 102 and 104, and the valve 96 of the other bank is connected to the leads 102 and 105. These leads are connected into the automatic cyclic control system which will now be described.

*Automatic control*

As has been explained hereinabove in connection with the description of the several components of the feeding and watering mechanisms, the entire apparatus is well adapted for being automatically operated in a predetermined cycle by which the cages of the several levels will be successively supplied with feed and the cups will be periodically flushed and supplied with water. Such automatic operation is facilitated by the electrical operating means for each of the several components of the entire apparatus. These electrical operating means are readily united in a single system under the control of a known type of program clock, by circuit arrangements typified by those shown in Fig. 13, which will now be briefly described.

The circuits depicted in Fig. 13 are designed for automatic control of the three level system shown in Fig. 1 and are adapted to be energized from a standard two-wire alternating current supply 106, power from the ungrounded wire of which is made available at the line side of a double pole single throw switch 107. Closing this switch and the single throw switch 108 drives a program clock 109 and lights a red signal bulb R to indicate that the clock is operating and that the switchboard is set up for automatic control.

Current flows through the switch 108, the pointer of transfer switch 110 which is driven by synchronous motor 111, and through operating coil 112 of the first feeder level relay 113. As shown, parallel circuits energize the first solenoid 35 to project its tripping pin 36 and the first solenoid 57 to retract its tripping finger 55. Operation of the relay 113 closes its contact 114 so that current flows through operating coil 115 of contactor 116 for the motor 13, causing contacts 117 and 118 to close, thereby energizing the motor.

A parallel source of power to the operating coils of motor contactor 116, solenoids 35 and 57 and relays 113 is cut in through the normally closed contact 119 of locking release relay 120 and the now closed contact 117 of contactor 116. Thus the first of the feed conveyor belts 42 to be put into operation continues to operate, and the buckets 23 continue to unload at that conveyor, after the program clock 109 ceases to energize the first signal circuit.

The pointer of the transfer switch 110 now becomes automatically shifted to its second contact point because energization of the synchronous motor 111 through the normally closed limit switch 121 began when the program clock signal circuit was first closed. A trip on the pointer then opens switch 121 and closes the normally open limit switch 122. Soon after these movements the pointer of program clock 109 has left its first contact point and no longer controls the circuit which it initially closed. However, this circuit is maintained through the closed switch 122.

When the pointer of the transfer switch 110 reaches its second contact, the tripping device connected to the pointer closes switch 121 and opens switch 122. This stops the motor 111, and the pointer remains on its second contact point. The transfer switch is thus set to energize the next circuit, for performing the second step in the cycle of operations, just as soon as the next impulse is received from the program clock. Contacts 117 and 118 of the contactor 116 of the motor 13 are held closed because operating coil 115 is being energized directly from the supply line through contact 119 of the locking release relay 120, as well as through contact 117 of its own contactor. Thus the motor 13 continues to operate until contact 119 of the locking release relay 120 is opened. This is done by the program clock as it continues to run, whereupon both contacts 117 and 118 open because the operating coil 115 is deenergized.

When the program clock again energizes its circuit the pointer of the transfer switch is automatically shifted to the third contact point of the switch. The appropriate contact points (first, third, fifth, etc.) of the program clock and transfer switch are connected to the various instrumentalities to produce the following operations substantially concurrently and simultaneously each time one of these contacts is energized:

1. Starting the motor 13.
2. Driving the elevator belt 22.
3. Driving the double V-belt to rotate all the clutch pulleys 52.
4. Driving the V-belt 79 to operate the feed return conveyor belt 74.
5. Actuation of the clutch 51 at the first level to which feed is to be conveyed, thus setting in motion the corresponding conveyor belt 42.
6. Projection of the corresponding tripping pin 36 to dump the buckets 23 at the selected level.

Predetermined setting of the program clock allows the foregoing operations to continue until the selected conveyor belt 42 is covered with feed throughout its whole length. Closing the second contact on the program clock is arranged then to pass current through the second contact on the transfer switch 110 to the operating coil of the locking release relay 120, which opens contact 119 and stops the operating cycle. When contact 119 again closes it will not energize any of the operating coils, since the contact 117 of motor contactor 116 will then be open.

Feeding at the second, third and any additional levels is then practiced in sequence as the program clock continues to run, each operation involving the same set of operations as the first. It will be observed that only one level is operated at a time. The power demand is thus low and a light motor 13 suffices.

Operation of the valves 95 and 96 (Fig. 14) to flush and fill the drinking cups 5 periodically in the automatic cycle is accomplished by connecting the leads 102, 103, 104 and 105 from these valves (Fig. 14) to the circuits in Fig. 13 as follows:

The lead 102 is connected to the grounded wire of the main supply line 106. The lead 103 is connected to the last contact point on the transfer switch 110. Lead 105 is connected to the next to last contact point on the transfer switch. Lead 104 is connected to the second next to last contact point of the transfer switch.

When the pointer of the transfer switch reaches the second next to last contact point and an impulse is delivered by the program clock 110, current flows through the operating coil 130 of the first watering relay 131 and through the solenoid operating the flushing valve 96 of one of the two banks shown in Fig. 14. Energization of the coil 130 closes contact 132 of the relay 131 to energize the solenoid controlling main valve 95 and open that valve. With the valves 95 and 96 opened, water flows through them in sufficient quantity to flush successively all of the cups of the first bank, in the manner heretofore explained.

Thereafter, the pointer of the program clock moves off its second from last contact and the valves 95 and 96 close. As soon as the transfer switch pointer moves to the next to last contact, the next impulse from the program clock will energize main solenoid valve 95 and the other valve 96, which thereupon open to flush the second bank of cups. The operation here is the same as has been explained in the flushing of the first bank.

With the flushing of both banks of cups completed, the pointer of the transfer switch moves to the last contact to complete a circuit, when the program clock sends out its next impulse, through the solenoid of the main valve 95 only. This supplies the filling valves 98 only, and water thus flows at a low rate into the upper cups and thence into the lower cups without any flushing action, as has been explained, so that all the cups are soon filled. Thereafter, continued movement of the program clock and transfer switch deenergizes the solenoid which controls valve 95, so that the valve closes and no more water is supplied to the cups until the flushing operation is again reached in the cycle.

The series of single-throw switches 140 shown in Fig. 13 can be operated manually at any time and in any order and combination to energize any of the instrumentalities and cause it to operate, without regard to the cyclic sequence provided by the program clock. Thus, feed can be supplied to any of the levels out of turn, or it can be removed ahead of the normal schedule. Water can be provided, with or without flushing the cups, oftener than would result from the cycle provided by the program clock.

The electrical circuits and the disclosed sequence in which the several instrumentalities are operated, as well as the manner in which they are controlled, are all given by way of exemplification merely. It is believed to be obvious that the mechanical and electrical operating elements of the elevator, conveyor and watering mechanisms can be differently related and controlled, all within the broad spirit of the invention.

Similarly, changes may be made in the individual mechanical and electrical elements as well as in their mode of combination, all within the spirit of the inventive concept and the scope of the appended claims.

I claim:

1. A feeding apparatus for supplying feed to a battery of superposed cages comprising in combination with said cages, a feed supply hopper below said cages, a power feed supply conveyor communicating with said hopper and extending upwardly therefrom to receive feed from said hopper and convey the same upwardly to the level of said cages, an individual, horizontal, power feed delivery conveyor combined with each of said cages to deliver feed from said supply conveyor to said cages, said horizontal conveyors being combined with said supply conveyor by the disposition of a portion of the flight of each horizontal conveyor in feed receiving relation with said supply conveyor, and means at each of said cages operatively associated in feed receiving relation with said horizontal conveyors to receive unconsumed feed and operatively associated with said hopper to return feed to said hopper.

2. A feeding apparatus for supplying feed to a battery of superposed cages comprising in combination with said cages, a feed supply hopper below said cages, a power feed supply conveyor communicating with said hopper and extending upwardly therefrom to receive feed from said hopper and convey the same upwardly to the level of said cages, an individual, horizontal, power feed delivery conveyor combined with each of said cages, to deliver feed from said supply conveyor to said cages, said horizontal conveyors being combined with said supply conveyor by the disposition of a portion of the flight of each horizonal conveyor in feed receiving relation with said supply conveyor, and selectively operable means for controlling the discharge of feed from said supply conveyor to said individual horizontal conveyor.

3. A feeding apparatus for supplying feed to a battery of superposed cages comprising in combination with said cages, a feed supply hopper below said cages, a power feed supply conveyor communicating with said hopper and extending upwardly therefrom to receive feed from said hopper and convey the same upwardly to the level of said cages, an individual, horizontal, power feed delivery conveyor combined with each of said cages to deliver feed from said supply conveyor to said cages, said horizontal conveyors being combined with said supply conveyor by the disposition of a portion of the flight of each horizonal conveyor in feed receiving relation with said supply conveyor, and means for returning feed from said supply conveyor to said hopper without delivery thereof to any of said individual horizontal conveyors.

4. A feeding apparatus for supplying feed to a battery of superposed cages comprising in combination with said cages, a feed supply hopper below said cages, a power feed supply conveyor communicating with said hopper and extending upwardly therefrom to receive feed from said hopper and convey the same upwardly to the level of said cages, an individual, horizontal, power feed delivery conveyor combined with each of said cages to deliver feed from said supply conveyor to said cages, said horizontal conveyors being combined with said supply conveyor by the disposition of a portion of the flight of each horizonal conveyor in feed receiving relation with said supply conveyor, and selectively operable means for controlling the discharge of feed from said supply conveyor to said individual horizontal conveyors.

5. A feeding apparatus for supplying feed to a battery of superposed cages comprising in combination with said cages, a feed supply hopper below said cages, an upwardly extending, power, feed supply conveyor having a flight return pulley in said hopper, tiltable feed receiving buckets on said conveyor to receive feed from said hopper and convey the same upwardly to the level of said cages, an individual horizontal power feed delivery conveyor combined with each of said cages to deliver feed from said supply conveyor to said cages, said horizontal conveyors being combined with said supply conveyor by the disposition of a portion of the flight of each horizontal conveyor in feed receiving relation with said vertical conveyor, and means at said individual horizontal conveyors for tilting said buckets for delivery of feed therefrom to said horizontal conveyors.

6. A feeding apparatus for supplying feed to a battery of superposed cages comprising in combination with said cages, a feed supply hopper below said cages, an upwardly extending, power, feed supply conveyor having a flight return pulley in said hopper, tiltable feed receiving buckets on said conveyor to receive feed from said hopper and convey the same upwardly to the level of said cages, an individual, horizontal, power feed delivery conveyor combined with each of said cages to deliver feed from said supply conveyor to said cages, said horizontal conveyors being combined with said supply conveyor by the disposition of a portion of the flight of each horizontal conveyor in feed receiving relation with said supply conveyor, and means at said individual horizontal conveyors for tilting said buckets for delivery of feed therefrom to said horizontal conveyors, said means being selectively controlled through electromagnetic mechanism.

7. A feeding apparatus for supplying feed to a battery of superposed cages comprising in combination with said cages, a feed supply hopper below said cages, a power feed supply conveyor communicating with said hopper and extending upwardly therefrom to receive feed from said hopper and convey the same upwardly to the level of said cages, an individual, horizontal, power feed delivery conveyor combined with each of said cages to deliver feed from said supply conveyor to said cages, said horizontal conveyors being combined with said supply conveyor by the disposition of a portion of the flight of each horizontal conveyor in feed receiving relation with said supply conveyor, and a common drive means for all of said conveyors.

8. A feeding apparatus for supplying feed to a battery of superposed cages comprising in combination with said cages, a feed supply hopper below said cages, a power feed supply conveyor communicating with said hopper and extending upwardly therefrom to receive feed from said hopper and convey the same upwardly to the level of said cages, an individual, horizontal, power feed delivery conveyor combined with each of said cages to deliver feed from said supply conveyor to said cages, said horizontal conveyors being combined with said supply conveyor by the disposition of a portion of the flight of each horizontal conveyor in feed receiving relation with said supply conveyor, and a common drive means for all of said conveyors, said means comprising a source of power, a drive therefrom to the supply conveyor and a separate drive therefrom to said horizontal conveyors.

9. A feeding apparatus for supplying feed to a battery of superposed cages comprising in combination with said cages, a feed supply hopper below said cages, a power feed supply conveyor communicating with said hopper and extending upwardly therefrom to receive feed from said hopper and convey the same upwardly to the level of said cages, an individual, horizontal, power feed delivery conveyor combined with each of said cages to deliver feed from said supply conveyor to said cages, said horizontal conveyors being combined with said supply conveyor by the disposition of a portion of the flight of each horizontal conveyor in feed receiving relation with said supply conveyor, a common drive means for all of said conveyors, said means comprising a source of power, a drive therefrom to the supply conveyor and a separate drive therefrom to said horizontal conveyors, and individual, selectively controlled, clutch means for each of said individual power conveyors.

10. A feeding apparatus for supplying feed to a battery of superposed cages comprising in combination with said cages, a feed supply hopper below said cages, a power feed supply conveyor communicating with said hopper and extending upwardly therefrom to receive feed from said hopper and convey the same upwardly to the level of said cages, an individual horizontal power feed delivery conveyor combined with each of said cages to deliver feed from said supply conveyor to said cages, said horizontal conveyors being combined with said supply conveyor by the disposition of a portion of the flight of each horizontal conveyor in feed receiving relation with said supply conveyor, and an additional horizontal, power conveyor below said cages and communicating with all of said individual horizontal conveyors thereof and with the hopper to return unconsumed feed from said individual horizontal conveyors to said hopper.

11. A feeding apparatus for supplying feed to a battery of superposed cages comprising in combination with said cages, a feed supply hopper below said cages, a power feed supply conveyor characterized by the provision of a plurality of individual feed buckets communicating with said hopper and extending upwardly therefrom to receive feed from said hopper and convey the same upwardly to the level of said cages, an individual horizontal power feed delivery conveyor combined with each of said cages to deliver feed from said supply conveyor to said cages, said horizontal conveyors being combined with said supply conveyor by the disposition of a portion of the flight of each horizontal conveyor in feed receiving relation with said supply conveyor, and means for selectively discharging feed from said buckets to the individual horizontal conveyors.

12. The feeding apparatus as set forth in claim 11 provided with means for discharging said buckets before reaching any of said individual conveyors for returning feed therein to the hopper.

References Cited in the file of this patent

UNITED STATES PATENTS

| Number | Name | Date |
|---|---|---|
| 312,341 | Duryea | Feb. 17, 1885 |
| 948,661 | Nee | Feb. 8, 1910 |
| 1,186,444 | Schuchardt | June 6, 1916 |
| 1,392,311 | Egeland | Oct. 4, 1921 |
| 1,597,929 | Sjolander et al. | Aug. 31, 1926 |
| 2,043,595 | Raymond | June 9, 1936 |
| 2,068,566 | Olson et al. | Jan. 19, 1937 |
| 2,197,160 | Schuppner | Apr. 16, 1940 |
| 2,280,941 | Adams | Apr. 28, 1942 |
| 2,302,314 | Haggart | Nov. 17, 1942 |
| 2,309,458 | Ingraham | Jan. 26, 1943 |
| 2,310,461 | Regan et al. | Feb. 9, 1943 |
| 2,384,900 | Duncan | Sept. 18, 1945 |
| 2,522,449 | Inman | Sept. 12, 1950 |
| 2,535,866 | Rasmussen | Dec. 26, 1950 |
| 2,552,192 | Lawson | May 8, 1951 |
| 2,563,321 | Dugan | Aug. 7, 1951 |